United States Patent
Suzuki et al.

[11] Patent Number: 5,168,421
[45] Date of Patent: Dec. 1, 1992

[54] FILM CAPACITOR AND PROCESS FOR PRODUCING IT

[75] Inventors: Motoyuki Suzuki, Kyoto; Yukichi Deguchi, Otsu, both of Japan

[73] Assignee: Toray Industries, Inc., Japan

[21] Appl. No.: 640,430

[22] PCT Filed: Sep. 20, 1990

[86] PCT No.: PCT/JP90/01204

§ 371 Date: Jan. 28, 1991

§ 102(e) Date: Jan. 28, 1991

[87] PCT Pub. No.: WO91/04566

PCT Pub. Date: Apr. 4, 1991

[30] Foreign Application Priority Data

Sep. 20, 1989 [JP] Japan .................................. 1-245849

[51] Int. Cl.$^5$ .......................... H01G 4/08; H01G 7/00
[52] U.S. Cl. ..................................... 361/323; 29/25.42
[58] Field of Search ................. 29/25.42; 361/308, 309, 361/310, 328, 329, 330, 323, 402, 403, 404, 517, 518, 535, 536, 539

[56] References Cited

U.S. PATENT DOCUMENTS

| | | | |
|---|---|---|---|
| 3,585,468 | 6/1971 | Chertok et al. | 361/323 |
| 3,806.775 | 4/1974 | Edman | 361/323 |
| 4,578,737 | 3/1986 | Westermann | 361/308 |
| 4,672,506 | 6/1987 | Deguchi et al. | 361/323 |

FOREIGN PATENT DOCUMENTS 64-77910 3/1989 Japan .

Primary Examiner—Donald A. Griffin
Attorney, Agent, or Firm—Austin R. Miller

[57] ABSTRACT

At least a part of a protective layer (1, 4a, 4b, 5a, 5b, 6a, 6b, 6c, 7, 8a, 8b) provided on the outer surface of a capacitance generating portion (2) of a film capacitor is constructed from a substantially non-oriented polyphenylenesulfide film (10). Since the non-oriented polyphenylenesulfide film (10) substantially does not accompany thermal shrinkage when it is heat stuck or soldered, and it absorbs the deformation due to the thermal shrinkage of other layers of the protective layer, the sticking stability and dimensional stability in the protective layer can be ensured. As a result, the thermal resistance of the protective layer and the thermal resistance of the capacitor can be improved as well as the simplification of sticking process or omission of an adhesive becomes possible. Moreover, this can serve to further miniaturization of capacitors.

14 Claims, 3 Drawing Sheets

FILM CAPACITOR AND PROCESS FOR PRODUCING IT

TECHNICAL FIELD OF THE INVENTION

The present invention relates to a film capacitor and a process for producing it. More particularly, the present invention relates to a film capacitor suitable to use for so-called chip capacitors of the surface mounting type, and a process for producing it.

BACKGROUND OF THE INVENTION

Recently, electronic parts such as capacitors have been required to be small-sized, accompanying with miniaturization of electronic equipments. Accordingly, respect to film capacitors, so-called chip capacitors applicable with surface mounting have been developed. So-called stacking type film capacitors, wherein substantially planar and rectangularly cut dielectric films and electrodes such as deposited metal layers are stacked, are particularly favorable for miniaturization. In such a small-sized stacking type film capacitor, since usually a thin film is used as its dielectric film, the capacitance generating portion of the capacitor is likely to be injured. Therefore, a protective layer formed by stacking thick films or sheets is provided on the outer side of the capacitance generating portion of the conventional film capacitor in order to protect the capacitance generating portion. In a chip capacitor, however, although a high thermal resistance for soldering is required for the protective layer because the capacitor is soldered directly to a printed circuit board, a protective layer having an excellent thermal resistance cannot be obtained by the conventional process wherein the protective layer is formed by stacking thick films or sheets.

In more detail, it is considered that a film having a high thermal resistance such as a heat sticking type polyimide film or a biaxially oriented polyphenylenesulfide film is used to form a protective layer having a high thermal resistance. However, there are defects in the polyimide film that the film is expensive and has a poor chemical resistant property, the deterioration of the film due to hydrosis under a high moist condition quickly occurs, and the dimensional stability of the film against moisture is poor. As a result, the environment for use of the film is restricted. In ordinary biaxially oriented polyphenylenesulfide films, according to the investigation by the inventors of the present invention, the films are easily delaminated between the film layers because the adhesive property between the film layers is not good. Therefore, a practical protective layer cannot be obtained. Further, although it is considered that a film, in which an adhesive is applied onto or a layer having an adhesive property is provided on a biaxially oriented polyphenylenesulfide film, is used (for example, JP-A-SHO 64-77910), a process for applying the adhesive must be added, and the process for producing the capacitors becomes complicated by the application process. Moreover, because the biaxially oriented polyphenylenesulfide film slightly shrinks accompanying with a large shrinkage stress when the film is heated such as when the capacitor is attached, if a usual adhesive is used, the deformation or delamination of the protective layer occurs, for example, when the capacitor is dipped in a molten solder. Therefore, a practical protective layer also cannot be obtained.

DISCLOSURE OF THE INVENTION

An object of the present invention is to provide a film capacitor which has excellent thermal resistance, chemical resistance and stability against moisture and has a protective layer capable of simplifying the sticking process or omitting an adhesive layer, and a process for producing it.

To accomplish this object, a film capacitor according to the present invention has a protective layer on at least a part of the outer surface of a capacitance generating portion constructed from the layers of a dielectric film and electrodes, and is characterized in that at least a part of the protective layer is a substantially non-oriented film consisting of polyphenylenesulfide.

In processes for producing the film capacitor according to the present invention, there are two processes wherein a desired protective layer is formed after a protective layer forming material is stacked on the outer surface of the capacitance generating portion and wherein a desired protective layer is made in advance using a protective layer forming material and the protective layer made is stacked on the outer surface of the capacitance generating portion at a required position.

In the former process, a substantially amorphous and substantially non-oriented polyphenylenesulfide film having a relative crystallization index of not greater than 3.0 is stacked on at least a part of a capacitance generating portion constructed from the layers of a dielectric film and electrodes to make a stacked body, and the stacked body is heated at a temperature of not less than 100° C. and lower than the melting point of polyphenylenesulfide, and pressed in the thickness direction of the stacked body at a pressure of not less than 1 kg/cm$^2$.

In the latter process, a film stacked body including at least one layer of a substantially amorphous and substantially non-oriented polyphenylenesulfide film having a relative crystallization index of not greater than 3.0 is made, the film stacked body is heated at a temperature of not less than 100° C. and lower than the melting point of polyphenylenesulfide, and pressed in the thickness direction of the film stacked body at a pressure of not less than 1 kg/cm$^2$, and thereafter, the film stacked body is stacked on at least a part of the outer surface of a capacitance generating portion constructed from the layers of a dielectric film and electrodes.

In the present invention, the material of a film forming a dielectric film of a capacitor is not particularly restricted. For example, any of well-known materials of a polyester such as polyethylene terephthalate or polyethylene naphthalate, a polypropylene such as polypropylene, polystyrene, polycarbonate, polyphenylenesulfide, polyetheretherketone or polyimide can be used. In the present invention, however, because the film for the protective layer has high thermal resistance and chemical resistance, a film having a maximum temperature for continuous use higher than 120° C., such as a polyethylene terephthalate, polyethylene naphthalate, polyphenylenesulfide or polyetheretherketone film, is effective as the dielectric film. In particular, it is very effective in the present invention to use a film having a maximum temperature for continuous use higher than 155° C. such as a polyethylene naphthalate, polyphenylenesulfide or polyetheretherketone film. Furthermore, the dielectric of the capacitor may be a dielectric layer in which a layer formed by, for example, coating operates as a dielectric composite, except the above-mentioned films.

In the capacitor according to the present invention, an electrode may be a thin metal layer formed by, for example, vacuum deposition, or a metal foil having a self-supporting property.

Although the structure of the capacitor may be a stacking type structure in which substantially planar layers of the dielectric film and the electrodes are stacked, or a winding type structure in which the dielectric film and the electrodes are wound at a state that they are stacked, particularly the stacking type film capacitor is effective in the present invention.

The capacitor according to the present invention is a capacitor using a substantially non-oriented polyphenylenesulfide film (hereinafter, referred to as PPS-NO film) for the protective layer. However, it is not necessary that the entire protective layer is constructed from a PPS-NO film, and as long as a part of the protective layer which can maintain its characteristic, i.e., not less than 20% relative to the entire thickness of the protective layer, preferably not less than 40%, more preferably not less than 40% and not greater than 70% is constructed from a substantially non-oriented PPS-NO film, other sheets, films or resins constructed from a polyester, a biaxially oriented polyphenylenesulfide or polyimide film etc. may be used together with the non-oriented polyphenylenesulfide film. Although the position required to provide a protective layer varies depending upon the type of capacitors, the protective layer is provided on at least a part of the outer surface of a capacitance generating portion constructed from the layers of a dielectric film and electrodes.

The substantially non-oriented polyphenylenesulfide film is a film formed from a resin composition material whose main component is poly-p-phenylenesulfide. The thickness of the PPS-NO film is preferably in the range of 15 $\mu$m-200 $\mu$m. Further, the resin composition material whose main component is poly-p-phenylenesulfide (hereinafter, referred to as PPS resin composition material) means a composition material containing poly-p-phenylenesulfide at a content of not less than 70 wt. %, preferably not less than 85 wt. %. If the content of poly-p-phenylenesulfide is less than 70 wt. %, the thermal resistance, frequency characteristic and temperature characteristic of the film formed from the composition material are injured. Furthermore, poly-p-phenylenesulfide (hereinafter, referred to as PPS) means a polymer in which not less than 70 mol % (preferably not less than 85 mol %) of the recurring unit is a unit shown by a constitutional formula

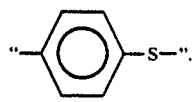

If such a component is less than 70 mol %, the crystallization property and heat transition temperature of the polymer are decreased, the thermal resistance, dimensional stability and mechanical properties of the film formed from the resin composition material, whose main component is PPS, are injured. The melt viscosity of PPS is preferably in the range of 500–15,000 poise under the conditions of a temperature of 300° C. and a shear rate of 200 sec$^{-1}$.

In the present invention, "substantially non-oriented" means that the degrees of orientation measured from three directions of "Through", "Edge" and "End" are all not less than 0.70. Where, "a degree of orientation measured from a direction" is defined as a ratio $(I[\phi=30°]/I[\phi=0°])$ of (a) a photographic density $(I[\phi=0°])$ measured when an X-ray plate photograph is taken from a required direction and [2,0,0] diffraction ring of PPS crystal is scanned in the radial direction on the equator line by a micro-densitometer and (b) a photographic density $(I[\phi=30°])$ measured in the direction of 30°. Namely, the degree of orientation is in the range of 0–1, the isotropy in the plane perpendicular to the measurement direction becomes higher as this value approaches 1, and that the values in three directions are all near to 1 represents the substantially non-oriented status. In a case where a film is substantially amorphous and [2,0,0] diffraction ring of PPS crystal cannot be clearly observed, the film is fixed at a constant length and the measurement is performed after PPS crystal is formed by heat treating the film for one minute in an oven heated at 200° C. This degree of orientation measured does not change even after a capacitor is completed.

One of the preferred embodiments of the capacitor according to the present invention is a capacitor wherein the protective layer is formed only by a plurality of PPS-NO films and the PPS-NO films are stacked and bonded to each other without using an adhesive. Another embodiment of the capacitor according to the present invention is a capacitor having a protective layer formed from PPS-NO films and other films. Although a biaxially oriented polyphenylenesulfide film (hereinafter, referred to as PPS-BO film), a uniaxially oriented polyphenylenesulfide film, other resin films and fiber reinforced sheets can be used as the above other films, PPS-BO film is preferable from the viewpoint of the thermal resistance and thermal rigidity of the entire protective layer. PPS-NO films and PPS-BO films may be alternately stacked, or one or a plurality of PPS-BO films are stacked on at least one surface of one or a plurality of PPS-NO films and the protective layer may be formed by one or a plurality of layers of these film stacked bodies.

A biaxially oriented polyphenylenesulfide film (PPS-BO film) is a biaxially oriented film of a resin composition material whose main component is poly-p-phenylenesulfide. The thickness of the film is preferably in the range of 5 $\mu$m-100 $\mu$m. The thermal shrinkage after 10 minutes at 230° C. of the film is preferably in the range of 0%-+12% in the longitudinal direction of the film and in the range of −5%-+5% in the direction perpendicular to the longitudinal direction in order to ensure a high dimensional stability of the capacitor to be obtained.

Thus, in the capacitor having the protective layer which contains a layer of PPS-NO film, since the protective layer portion formed from PPS-NO film is more excellent in thermal dimensional stability than the protective layer portion formed from PPS-BO film, eventually the entire protective layer is extremely excellent in thermal resistance as compared with the protective layer formed only by PPS-BO film. Moreover, since PPS-NO film layers can be heat stuck to each other substantially without accompanying thermal shrinkage, the adhesive ability between layers can be ensured by the presence of PPS-NO film layers. Further, in the case where PPS-BO film is used together with PPS-NO film for a protective layer, the delamination of the protective layer and the breakage of the dielectric layer due to the deformation of the protective layer can be prevented because PPS-NO film layer absorbs the dimensional variation of PPS-BO film caused when the capacitor is dipped in solder.

A further preferred embodiment of the capacitor according to the present invention is a capacitor in which the outermost layer of the protective layer is a PPS-BO film. In this case, although a PPS-BO film, a PPS-NO film, another film or a fiber reinforced sheet can be used as the second layer next to the outermost layer, the PPS-BO film or PPS-NO film is preferable among these films and sheets. When the second layer is also a PPS-BO film, another layer such as an adhesive layer may be interposed between the film layers as long as the other layer does not injure the mechanical and thermal properties of the PPS-BO films, and preferably the thickness of the other layer is not greater than 30% of the thickness of the PPS-BO film. In such a case, preferably an adhesive, whose main component is a thermosetting or thermoplastic resin the softening temperature after curing of which is not less than 260° C. If the second layer is a PPS-NO film, the PPS-BO film of the outermost layer and the PPS-NO film of the second layer can be stacked and stuck to each other substantially without using an adhesive.

The strength of a capacitor element can be maintained as well as the thermal resistance, moisture resistance and chemical resistant property of the capacitor can be balanced at a high level, by disposing a PPS-BO film layer as the outermost layer. Therefore, a capacitor with substantially no encapsulation can be obtained by this structure. The thickness of the PPS-BO film layer forming the outermost layer is preferably not less than 25 μm or not less than 30% of the entire thickness of the protective layer from the viewpoint of effectively protecting the capacitance generating portion. PPS-BO film may be used as a layer other than the outermost layer. In such a case, preferably PPS-NO films and PPS-BO films are alternately disposed.

As the structure of a protective layer where the outermost layer of the protective layer is formed by a PPS-BO film, structures of PPS-BO film/PPS-NO film arranged from the outer side, PPS-BO film/PPS-NO film/PPS-BO film, PPS-BO film/PPS-NO film/PPS-BO film/PPS-NO film, the structure wherein further more layers are stacked, and the structure wherein other resins, sheets or films are interposed between the layers, can be considered. Any of these structures may be employed.

Furthermore, another preferred embodiment of the capacitor according to the present invention is a capacitor in which the outermost layer of the protective layer is a substantially non-oriented or biaxially oriented polyphenylenesulfide film whose outer surface is thermally crosslinked (hereinafter, referred to as thermally crosslinked PPS film). The thermally crosslinking treatment means that a crosslinked structure is introduced into at least a surface portion of a polyphenylenesulfide film when the film is exposed to a high temperature of not less than 220° C., and the dimensional stability, flame proof property and insoluble property of the film can be achieved, or that a crosslinked structure is introduced by such a method. In such a treatment, preferably an application layer containing fine compound particles of a metal selected from the group consisting of iron, cobalt and nickel at a content of preferably at least 30 wt. % is provided on a PPS-NO film or PPS-BO film, and the PPS-NO film or PPS-BO film with the applied layer is heat treated at a temperature of not less than 220° C. The timing of applying the layer may be any of the times of before, during and after production of a capacitor element. PPS film may not be particularly thermally crosslinked at the time when the application layer has been provided. When the capacitor is soldered, its thermal crosslinkage can be achieved by the heat of the molten solder. Although it is known that polyphenylenesulfide is crosslinked even by heat treatment at a high temperature in a gas containing oxygen, this method is not desirable because the treated polyphenylenesulfide becomes fragile.

The strength of a capacitor element can be maintained as well as the thermal resistance, moisture resistance, chemical resistance property and flame proof property of the capacitor can be balanced at a high level by its outermost layer formed by a thermally crosslinked PPS film. Also, this structure can achieve a capacitor substantially with no encapsulation.

Next, as a process for producing a capacitor according to the present invention such as the one mentioned above, it is not necessary to change a conventional process to a great extent. Namely, any conventional process can be applied as long as the process includes a step of obtaining a dielectric film and an electrode formed by a metal foil or a deposited layer etc., and a step of stacking the dielectric film and the electrode so as to generate a capacitance and a step of providing a protective layer on the obtained capacitance generating portion. Alternatively, a new process may be employed.

In the present invention, a substantially amorphous film having a relative crystallization index of not greater than 3.0 is preferably used as the PPS-NO film used for the protective layer of a capacitor from the viewpoint of increasing the handling ability of the film and the adhesive ability between the films. Where, the relative crystallization index is defined by the ratio "$I_{200}/I_{25}$" of the maximum intensity ($I_{200}$) at [2,0,0] diffraction peak of PPS crystal in the wide angle diffraction profile of the film due to X-ray and the intensity ($I_{25}$) at the point of $2\theta = 25°$.

When the substantially amorphous polyphenylenesulfide film is stacked on the PPS-NO film or PPS-BO film substantially without interposing an adhesive therebetween, preferably the films are pressed in the thickness direction of the films and brought into close contact with each other under the conditions of a temperature of not less than 100° C. and lower than the melting point of polyphenylenesulfide and a pressure of not less than 1 kg/cm². The crystallization temperature of PPS-NO film used in the present invention during heating the film is preferably not less than 130° C. from the viewpoint of easy processing. The crystallization temperature during heating the film means a temperature representing a maximum value of the peaks appearing in the range of 100° C.–150° C. by the propagation of the crystallization of PPS when the film is heated from a room temperature at a rate of 20° C./min in differential scanning calorimetry analysis.

Although the protective layer can have sufficient dimensional stability, thermal resistance and thermal rigidity by employing the above-mentioned structures for the capacitor according to the present invention, the thermal resistance can be further increased by heat treating the protective layer after forming the protective layer, and crystallizing the PPS-NO film portion so that the film portion has a density of not less than 1,330 g/cm³, preferably not less than 1,350 g/cm³.

As methods for forming the outermost layer of a protective layer from a PPS-BO film, there are methods wherein a PPS-BO film is stacked as the outermost layer after a material for the protective layer containing a PPS-NO film is provided, wherein a PPS-NO film and a PPS-BO film are stacked to each other to form the protective layer so that the PPS-BO film is positioned at an outer side, and wherein a composite film in which a PPS-NO film and a PPS-BO film are stacked to each other is prepared in advance, and the protective layer is formed by providing the composite film so that the PPS-BO film portion is positioned at outer side.

In the case where the outermost layer of a protective layer is formed by a thermally crosslinking PPS film, there are methods wherein the thermally crosslinking PPS film is prepared in advance before the capacitor element is made, and the thermally crosslinked PPS film is stacked as the outermost layer after a protective layer material containing a PPS-NO film is provided, and wherein, after a protective layer portion comprising a PPS-NO film or a PPS-NO film and a PPS-BO film is formed, the outer surface of the protective layer portion is thermally crosslinked.

In the capacitor according to the present invention, it is not always necessary that the protective layer is exposed as the outermost layer of the capacitor, and a so-called encapsulation of the capacitor such as a coating layer of polyimide resin, epoxy resin or polyphenylenesulfide resin may be provided around the capacitor element having the protective layer. However, the advantages due to the present invention can be obtained most effectively by a stacking type film chip capacitor substantially with no encapsulation.

Thus, in the film capacitor according to the present invention, since a substantially non-oriented polyphenylenesulfide film is used for at least a part of the protective layer, a capacitor having excellent thermal resistance, chemical resistant property and moisture resistance can be obtained. Moreover, since the non-oriented polyphenylenesulfide film substantially does not thermally shrink, the film absorbs the deformation force due to the thermal shrinkage of other layers in the protective layer. As a result, the dimensional stability of the entire protective layer can be ensured as well as a bad influence due to the thermal shrinkage to the capacitance generating portion can be prevented. Further, since PPS-NO films or PPS-NO film and PPS-BO film can be easily heat stuck to each other without an adhesive, the PPS-NO film basically does not thermally shrink as above-mentioned, and the PPS-NO film layer can absorb the thermal shrinkage of adjacent layers even if the thermal shrinkage occurs in the adjacent layers, a stable and strong sticking state can be ensured. Therefore, omission of an adhesive in a protective layer or great simplification of the sticking process is possible by forming the protective layer from only PPS-NO films or an appropriate combination of PPS-NO film and PPS-BO film or the like. Furthermore, if a PPS-BO film or a thermally crosslinked film is disposed as the outermost layer of the protective layer, a thermal rigidity can be offered to the outer surface of the protective layer, and substantially no encapsulation for the capacitor becomes possible, thereby further promoting the miniaturization of capacitors.

THE BEST MODE FOR CARRYING OUT THE INVENTION

Figure 1:
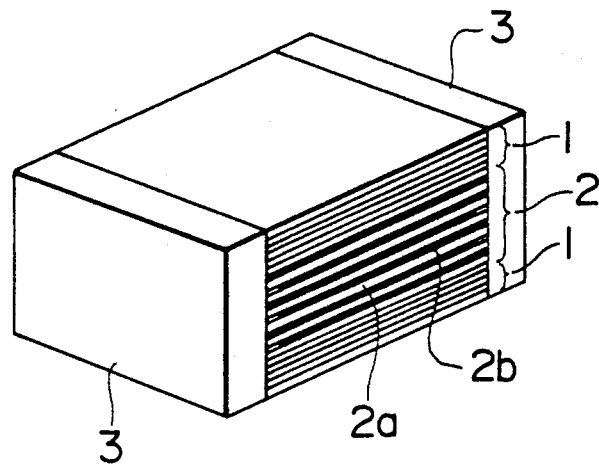
FIG. 1 is a schematic perspective view of a stacking type capacitor according to an embodiment of the present invention.
Figure 2:
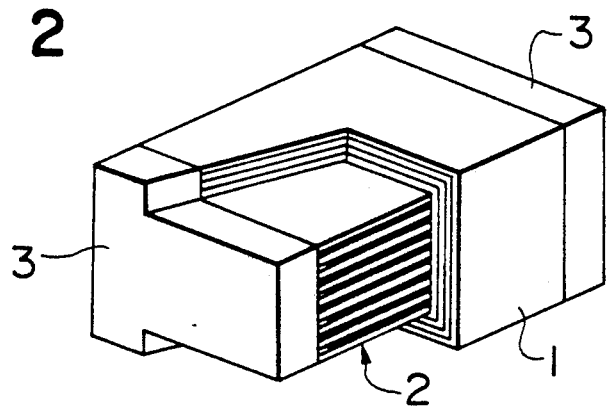
FIG. 2 is a schematic perspective view of a stacking type capacitor, partially cut away, according to another embodiment of the present invention.
Figure 3:
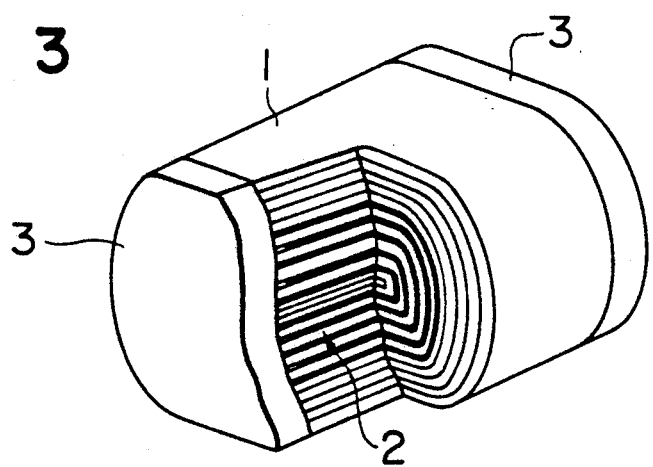
FIG. 3 is a schematic perspective view of a winding type capacitor, partially cut away, according to a further embodiment of the present invention.

The present invention can be applied to both of a stacking type capacitor and a winding type capacitor. The protective layer according to the present invention may be provided at a required position on the outer surface of a capacitance generating portion. For example, FIG. 1 illustrates a stacking type capacitor. In the capacitor, a protective layer 1 including PPS-NO film layers is stacked on the upper and lower outer surfaces of a capacitance generating portion 2 constructed from dielectric films 2a and electrodes 2b, and external electrodes (metallicon) 3 are provided on both sides of the capacitance generating portion 2. In the stacking type chip capacitor shown in FIG. 2, protective layer 1 is stacked over the entire periphery of capacitance generating portion 2. FIG. 3 illustrates a winding type capacitor. In the capacitor, protective layer 1 is wound on the periphery of capacitance generating portion 2.

Various modes can be employed as modes of protective layer 1, for example, as shown in FIGS. 4A-8B. In FIGS. 4A-8B, the lower sides show the capacitance generating portion sides and the upper sides show the outer surface sides of the protective layers.

Figure 4A:
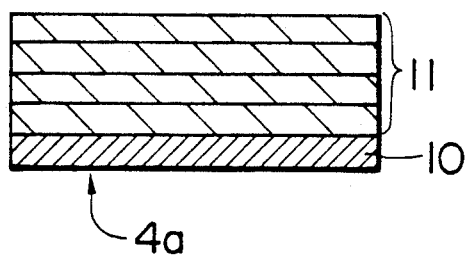
FIGS. 4A and 4B are schematic sectional views showing embodiments of the protective layers of capacitors according to the present invention.
Figure 4B:
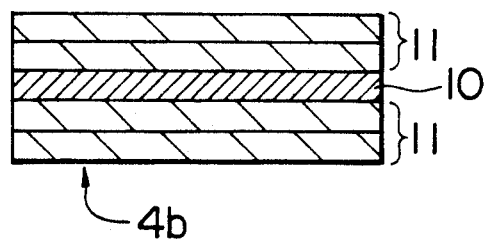

In FIG. 4A, a PPS-NO film layer 10 is provided on the capacitance generating portion side of protective layer 4a, and a layer 11 formed by a plurality of films constructed from PPS-BO film, PPS-UO film (uniaxially oriented polyphenylenesulfide film), NO, UO or BO film of other polymer etc., (hereinafter, referred to as other film layer 11) is stacked on the outer surface of the PPS-NO film layer 10. In FIG. 4B, PPS-NO film layer 10 is provided as an intermediate layer of protective layer 4b, and other film layers 11 are stacked on both sides of the intermediate layer.

In the above modes of the protective layer, PPS-NO film layer 10 can absorb the thermal shrinkage of other film layer 11, and bad influence to the capacitance generating portion accompanying with the thermal shrinkage can be prevented.

Figure 5A:
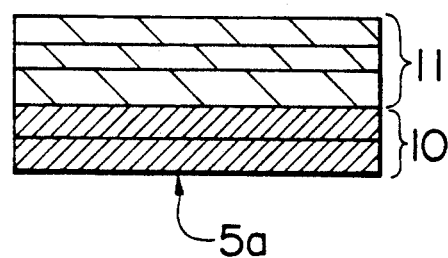
FIGS. 5A and 5B are schematic sectional views showing other embodiments of the protective layers of capacitors according to the present invention.

In FIG. 5A, a plurality of PPS-NO films 10 are stacked on the capacitance generating portion side of protective layer 5a, and other film layer 11 is stacked on the outer surface of the stacked PPS-NO films.

Figure 5B:
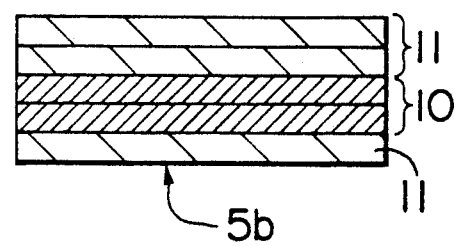

In FIG. 5B, a plurality of PPS-NO film layers 10 are provided as intermediate layers of protective layer 5b, and other film layers 11 are stacked on both sides of the intermediate layers. In such modes, PPS-NO films or PPS-NO film and an adjacent film or films such as PPS-BO film can be heat bonded to each other without an adhesive, and simplification of the bonding process is possible.

Figure 6A:
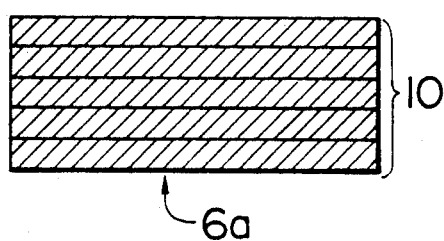
FIGS. 6A, 6B, and 6C are schematic sectional views showing further embodiments of the protective layers of capacitors according to the present invention.
Figure 6B:
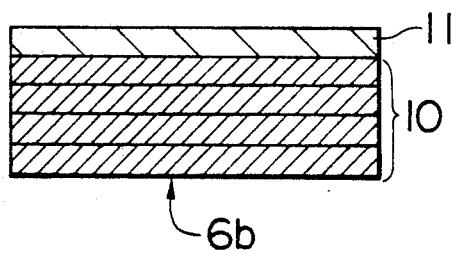
Figure 6C:
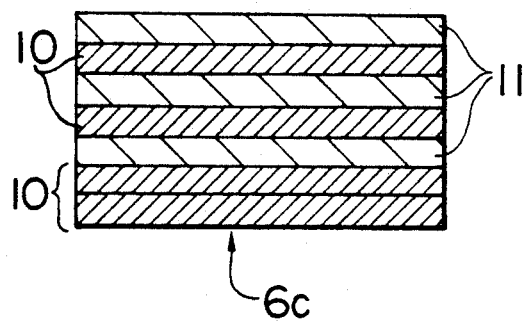

In FIG. 6A, protective layer 6a is constructed from only a plurality of PPS-NO films 10. In FIG. 6B, the outermost layer of protective layer 6b is formed by other film layer 11, and the inside portion thereof is constructed form a plurality of PPS-NO film layers 10. In FIG. 6C, one or a plurality of PPS-NO film layers 10 and other film layers 11 are alternately stacked to form protective layer 6c.

In such modes, complete non-adhesive sticking is possible with formation of a protective layer. In the modes shown in FIGS. 6B and 6C, if the other film layers 11 are PPS-BO films, particularly they can easily heat bonded to PPS-NO film layer 10 without an adhesive.

Figure 7:
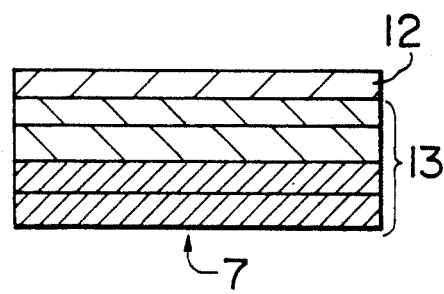
FIG. 7 is a schematic sectional view showing a further embodiment of the protective layer of a capacitor according to the present invention.

In the mode shown in FIG. 7, the outermost layer of protective layer 7 is formed by PPS-BO film layer 12. The inner layer portion 13 may be any of the modes shown in FIGS. 4A–6C.

In such a mode, rigidity at a high temperature (thermal rigidity) can be provided to the surface of protective layer 7; namely, the rigidity of the surface of the protective layer against molten solder. In turn, the form maintaining ability of the entire capacitor can be ensured.

Figure 8A:
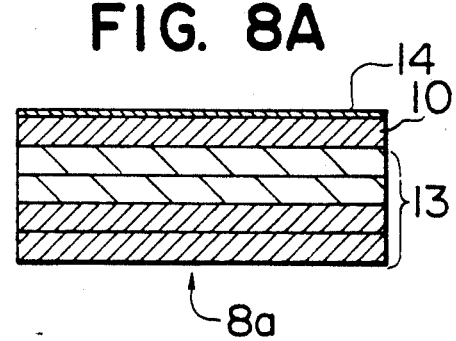
FIGS. 8A and 8B are schematic sectional views showing further embodiments of the protective layers of capacitors according to the present invention.
Figure 8B:
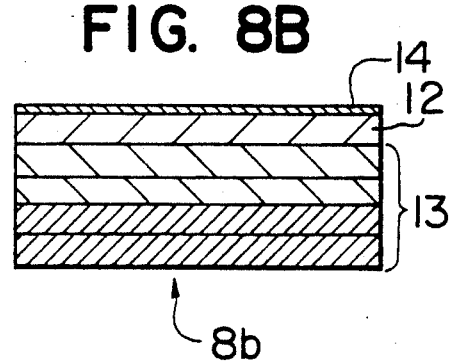

In the mode shown in FIG. 8A, the outermost layer of protective layer 8a is formed by PPS-NO film 10, and the outer surface of this PPS-NO film 10 is thermally crosslinked after iron oxide ($Fe_2O_3$) 14 is applied onto the outer surface. The inner layer portion 13 may be any of the modes shown in FIGS. 4A–6C. In protective layer 8b shown in FIG. 8B, the outermost layer thereof is formed by PPS-BO film 12, and the outer surface of this PPS-BO film 12 is thermally crosslinked after iron oxide 14 is applied. In such modes, thermal rigidity can be provided to the surface of the protective layer as well as an infusible property can be provided to outermost layer by the thermal crosslinkage.

Next, the preferred embodiments of the present invention will be explained more concretely. First, methods for determining and estimating characteristics of the film capacitor according to the present invention.

(1) Test for determining the thermal resistant property against molten solder of the capacitor:

A capacitor is dipped for ten seconds in a solder bath in which a solder is molten at 260° C., and its external appearance is visually determined. The criteria for the determination are as follows.

○ ... Although a discoloration slightly appears on the protective film portion, it is no problem in practical use.

× ... The protective film portion softens, or greatly deforms or delaminates, and it is a problem in practical use.

(2) Test for determining the thermal rigidity of the protective layer:

A capacitor is dipped in a solder bath in which a solder is molten at 260° C. After ten seconds, the degree of softening of the protective layer is determined by pinching it by tweezers at the state that it remains in the solder bath. The criteria for the determination are as follows.

⊚ ... There is no damage on the protective film portion.

○ ... Although there are some traces of softening of the protective layer such as the traces slightly damaged by the tweezers, it is not a large problem in practical use.

× ... The protective layer softens so that the deep traces damaged by the tweezers remain on the protective film portion, and it is a problem in practical use.

(3) Test for determining the deterioration of the capacitor due to moisture:

A capacitor is enclosed in a pressure container in which water is stored, and aged for two hours in an oven heated at 155° C. After that, the capacitor is taken out from the container, and visually determined. The criteria for the determination are as follows.

○ ... There is no alteration on the external appearance, and even if the capacitor is crumpled by hand, the protective layer is not delaminated and broken and has a sufficient strength.

× ... Although the external appearance does not change, the protective layer easily delaminates or breaks when the capacitor is crumpled, and it is fragile.

Next, the present invention will be explained in more detail by examples. However, the present invention is not restricted by the examples.

EXAMPLE 1

(1) Preparation of non-oriented polyphenylenesulfide film (PPS-NO film)

Sodium sulfide of 32.6 kg (250 mol, containing crystallization water at a content of 40 wt. %), sodium hydroxide of 100 g, sodium benzoate of 36.1 kg (250 mol) and N-methyl-2-pyrolidone (hereinafter, referred to as "NMP") of 79.2 kg were charged in an autoclave and dehydrated at 250° C. Thereafter, 1,4-dichlorobenzene (hereinafter, referred to as "p-DCB") of 37.5 kg (255 mol) and NMP of 20.0 kg were added to them, and the mixture was reacted at 265° C. for four hours. The reaction product was washed by water and dried, and poly-p-phenylenesulfide of 21.1 kg (yield : 78%), which was composed of p-phenylenesulfide of 100 mol % and had a melting viscosity of 3100 poise, was obtained.

Calcium stearate of 0.05 wt. % was added to this composition material, the composition material was molten at 310° C. by an extruder having a diameter of 40 mm and filtrated by a filter of 95% cut using metal fibers and having a porous diameter of 10 μm, and thereafter, the melted composition material was delivered out from a T-die having linear lips the gap of which was 1.5 mm. The delivered material was cast onto and solidified by cooling on a metal drum, which was maintained at 25° C., to make a non-oriented polyphenylenesulfide film having a thickness of about 25 μm. This film is referred to as PPS-NO-1. The degrees of orientation of PPS-NO-1 were Through=0.89, Edge=0.94 and End=0.91, and the film was substantially non-oriented. The relative crystallization index of this film was 1.2. The crystallization temperature when the film was heated was 135° C.

(2) Production of capacitor

PPS-NO-1 was slit at a width of 4.7 mm and the slit film was wound on a drum with a diameter of 600 mm by 10 turns. Two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound on the wound PPS-NO-1 by 1000 turns with an offset of 0.2 mm between the respective PPS films, and further, PPS-NO-1 was wound again on the wound PPS films by 10 turns.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating epoxy resin, the capacitor element was heat treated for five hours in an oven heated at 240° C., and a solder was plated on the surfaces of the metallicon portions to obtain a stacking type chip capacitor. This capacitor is referred to as "capacitor A". The result of estimation of capacitor A is shown in Table 1.

EXAMPLE 2

Two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound by 1000 turns with an offset of 0.2 mm between the respective PPS films onto a planar mandrel having a length of 320 mm and a width of 30 mm. The wound body was pressed from the upper and lower sides of the wound body in the direction of film thickness at a pressure of 30 kg/cm² for five minutes by a parallel-plate hot press machine heated at 180° C. After pressing, external electrodes were formed by flame coating of metallicon to both end surface of the wound body, and capacitor matrix elements were obtained by cutting the wound body at two positions opposite to each other.

The capacitor matrix element obtained was cut at a length such that the capacitance of the capacitor element to be obtained was 0.1 μF.

PPS-NO-1 obtained in Example 1 was slit at a width of 4.7 mm and the slit film was wound by five turns on the periphery of the obtained capacitor element (four surfaces other than the surfaces to which metallicon was applied. After the end portion of the would film was temporarily fixed by an adhesive tape, the capacitor element was press formed for one hour while a pressure of 30 kg/cm² was applied in the thickness direction of the dielectric film by the parallel-plate hot press machine heated at 200° C. Thereafter, a stacking type chip capacitor was obtained by plating solder onto the surfaces of the metallicon portions. This capacitor is referred to as "capacitor B". The result of estimation of capacitor B is shown in Table 1.

EXAMPLE 3

A biaxially oriented PPS film with an adhesive (referred to as "PPS-BO-1"), wherein an epoxy-resin adhesive was applied onto one surface of a biaxially oriented PPS film (produced by Toray Industries, Inc., "Torelina", nominal thickness; 25 μm) at a thickness of 3 μm by theoretical value, was slit at a width of 4.7 mm. The slit film was wound by five turns on a drum having a diameter of 500 mm so that the adhesive layer was positioned at an outer side, and on the would film, PPS-NO-1 obtained in Example 1 and slit at a width of 4.7 mm was wound by five turns. Further, on the wound film, two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound by 1000 turns with an offset of 0.2 mm between the respective PPS films. Furthermore, on the would film, PPS-NO-1 was wound again by five turns, and PPS-BO-1 with the adhesive was wound again by five turns so that the adhesive layer was positioned at an inner side.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating an epoxy resin, the capacitor element was heat treated for five hours in an oven heated at 240° C., and a solder was plated on the surfaces of the metallicon portions to obtain a stacking type chip capacitor. This capacitor is referred to as "capacitor C". The result of estimation of capacitor C is shown in Table 1.

EXAMPLE 4

A PPS-NO film was obtained in a manner similar to that in Example 1. Where, the casting speed was half of that in Example 1, and the thickness of the film was 50 μm. This film is referred to as "PPS-NO-2".

On the other hand, a biaxially oriented PPS film (produced by Toray Industries, Inc., "Torelina", nominal thickness; 50 μm) was prepared. This film is referred to as "PPS-BO-2".

PPS-BO-2 and PPS-NO-2 were slit at a width of 4.7 mm, the films were stacked such that the PPS-BO-2 was positioned at inner side, and the films were wound on a drum having a diameter of 600 mm by two turns. Further, two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound by 1000 turns with an offset of 0.2 mm between the respective PPS films. Furthermore, on the wound film, PPS-BO-2 and PPS-NO-2 were stacked and wound by 2 turns so that the PPS-NO-2 was positioned at outer side.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating an epoxy resin, the capacitor element was heat treated for five hours in an oven heated at 240° C., and a solder was plated on the surfaces of the metallicon portions to obtain a stacking type chip capacitor. This capacitor is referred to as "capacitor D". The result of estimation of capacitor D is shown in Table 1.

EXAMPLE 5

Biaxially oriented PPS films (produced by Toray Industries, Inc., "Torelina", nominal thickness; 25 μm) were heat laminated on both surfaces of PPS-NO-2 (thickness; 50 μm) obtained in Example 4, and multi-layer films with a construction of PPS-BO/PPS-NO/PPS-BO were obtained. A multi-layer film with an adhesive was obtained by applying an epoxy resin adhesive on one surface of the multi-layer films at a theoretical thickness of 3 μm.

The multi-layer film with an adhesive was slit at a width of 4.7 mm, and the slit film was wound by 5 turns on a drum having a diameter of 600 mm so that the adhesive layer was positioned at outer side.

Further, two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound by 1000 turns with an offset of 0.2 mm between the respective PPS films. Furthermore, on the wound film, the stacked film body with an adhesive was wound by 5 turns so that the adhesive layer was positioned at inner side.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating epoxy resin, the capacitor element was heat treated for five hours in an oven heated at 240° C., and a solder was plated on the surfaces of the metallicon portions to obtain a stacking type chip capacitor. This capacitor is referred to as "capacitor E". The result of estimation of capacitor E is shown in Table 1.

EXAMPLE 6

After ferric oxide particles having an average particle diameter of 0.4 μm were added to acrylic polyole resin (produced by Toray Industries, Inc., "Coatax" HL 608, solid concentration; 50 wt. %) and isocyanate (produced by Sumitomo-Beyer Corporation, "Sumijule", solid concentration; 75 wt. %), a ferric oxide coating material (the concentration of ferric oxide was 80 wt. % of the whole solid components) was made by mixing them.

The above coating material was diluted with ethyl acetate, and a thermally crosslinked film was obtained by applying the coating material onto one surface of PPS-NO-1 obtained in Example 1 at a post-dry thickness of 3 μm and drying it.

The thermally crosslinked film was slit at a width of 4.7 mm, and the slit film was wound by 10 turns on a drum having a diameter of 600 mm so that the thermally crosslinked surface (the surface applied with the ferric oxide coating material) was positioned at an outer side.

Further, two aluminum deposited biaxially oriented PPS films (produced by Toray Industries, Inc., "MC Torelina", nominal thickness; 2.5 μm, film width; 4.5 mm, margin; 0.5 mm) each having a left or right margin were wound by 1000 turns with an offset of 0.2 mm between the respective PPS films. Furthermore, on the wound film, the thermally crosslinked film was wound by 10 turns so that the thermally crosslinked surface was positioned at an inner side.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating epoxy resin, the capacitor element was heat treated for five hours in an oven heated at 240° C., and a solder was plated on the surfaces of the metallicon portions to obtain a stacking type chip capacitor. This capacitor is referred to as "capacitor F". The result of estimation of capacitor F is shown in Table 1.

EXAMPLE 7

A capacitor was obtained by applying the ferric oxide coating material obtained in Example 6 onto four surfaces other than the metallicon surfaces of capacitor A obtained in Example 1 and drying it. This capacitor is referred to as "capacitor G". The result of estimation of capacitor G is shown in Table 1.

EXAMPLE 8

After polyetheretherketone (produced by I. C. I., PEEK 380G) was melted at 400° C. by an extruder, the molten polyetheretherketone was delivered out from a T-die in a sheet-like form and it was rapidly cooled on a coating drum to obtain a substantially amorphous film. The film obtained was sequentially stretched biaxially at a stretching ratio of 2.5×2.5 and the stretched film was heat set for two seconds to obtain a biaxially oriented polyetheretherketone film having a thickness of 25 μm.

A biaxially oriented polyetheretherketone film with an adhesive (referred to as "PEEK-BO-1") was obtained by applying an epoxy resin adhesive on one surface of the above biaxially oriented polyetheretherketone film at a theoretical thickness of 3 μm. The PEEK-BO-1 was slit at a width of 4.7 mm, and the slit film was wound by 5 turns on a drum having a diameter of 600 mm so that the adhesive layer was positioned at an outer side. Further, on the wound film, PPS-NO-2 obtained in Example 1 and slit at a width of 4.7 mm was wound by 5 turns. Furthermore, two aluminum deposited biaxially oriented PPS films (produced by Toray Industries, Inc., "MC Torelina", nominal thickness; 2 5 μm, film width; 4.5 mm, margin; 0.5 mm) each having a left or right margin were wound by 1000 turns with an offset of 0.2 mm between the respective PPS films. Still furthermore, on the wound film, PPS-NO-1 was wound by 5 turns and PEEK-BO-1 with an adhesive was wound by 5 turns so that the adhesive layer was positioned at an inner side.

The film wound body obtained was heat treated at 180° C. for one hour in a hot air oven in the state where the body was wound on the drum. After a metallicon was applied on the side surfaces of the wound body, semicircular capacitor matrix elements were obtained by cutting the wound body at two positions opposite to each other on the periphery of the drum.

The capacitor matrix element obtained was cut at a length such that the capacitance of the capacitor element to be obtained was 0.1 μF. Thus, the capacitor element was obtained. After the cut surfaces of the capacitor element were protected by coating epoxy resin, the capacitor element was heat treated for five hours in an oven heated at 240° C., and a solder was plated on the surfaces of the metallicon portions to obtain a stacking type chip capacitor. This capacitor is referred to as "capacitor H". The result of estimation of capacitor H is shown in Table 1.

COMPARATIVE EXAMPLE 1

PPS-BO-1 obtained in Example 3 was used as a protective film instead of PPS-NO-1, and a capacitor was made in a manner similar to that in Example 1. This capacitor is referred to as "capacitor I". The result of estimation of capacitor I is shown in Table 1.

COMPARATIVE EXAMPLE 2

Polyimide film with a heat sticking property (produced by Dupont-Toray Corporation, "Capton" F type, film thickness; 25 μm) was used as a protective film instead of PPS-NO-1, and a capacitor was made in a manner similar to that in Example 1. This capacitor is referred to as "capacitor J". The result of estimation of capacitor J is shown in Table 1.

COMPARATIVE EXAMPLE 3

Polyester film (produced by Toray Industries, Inc., "Lumirror", film thickness; 25 μm) was used as a protective film instead of PPS-NO-1, and a capacitor was made in a manner similar to that in Example 1. This capacitor is referred to as "capacitor K". The result of estimation of capacitor K is shown in Table 1.

As is evident from the results of the above Examples and Comparative Examples, it is understood that the capacitor according to the present invention has excellent thermal resistance, dimensional stability and moisture resistance.

TABLE 1

| | | Structure of protective layer | Test for solder resistant property and thermal resistance | Test for thermal rigidity | Test for deterioration due to moisture |
|---|---|---|---|---|---|
| Example 1 | Capacitor A | PPS-NO | ◯ | ◯ | ◯ |
| Example 2 | Capacitor B | PPS-NO | ◯ | ◯ | ◯ |
| Example 3 | Capacitor C | PPS-BO/NO | ◯ | ◉ | ◯ |
| Example 4 | Capacitor D | PPS-BO/NO | ◯ | ◉ | ◯ |
| Example 5 | Capacitor E | PPS-BO/NO/BO | ◯ | ◉ | ◯ |
| Example 6 | Capacitor F | thermally crosslinked PPS-NO | ◯ | ◉ | ◯ |
| Example 7 | Capacitor G | PPS-NO/ thermal crosslinkage | ◯ | ◉ | ◯ |
| Example 8 | Capacitor H | PPS-NO/ PEEK-BO | ◯ | ◉ | ◯ |
| Comp. Ex. 1 | Capacitor I | PPS-BO | X | ◉ | ◯ |
| Comp. Ex. 2 | Capacitor J | polyimide | ◯ | ◉ | X |
| Comp. Ex. 3 | Capacitor K | biaxially oriented PET | X | X | ◯ |

INDUSTRIAL APPLICATION OF THE INVENTION

The capacitor according to the present invention has the above structure and can balance the thermal resistance, chemical resistant property and stability against moisture at a high level that cannot be achieved by conventional capacitors. As a result, a chip film capacitor having an excellent thermal resistance against a molten solder can be easily obtained by a process for producing a film capacitor which substantially is not changed from conventional processes. Therefore, the industrial application of the present invention is very effective.

We claim:

1. A film capacitor having a protective layer on at least a part of the outer surface of a capacitance generating portion constructed from the layers of a dielectric film and electrodes characterized in that at least a part of said protective layer is a substantially non-oriented film consisting of polyphenylenesulfide.

2. The film capacitor according to claim 1, wherein said polyphenylenesulfide film is thicker than said dielectric film.

3. The film capacitor according to claim or 2, wherein said protective layer comprises a plurality of layers, and at least a part of the plurality of layers are stuck to each other without using an adhesive.

4. The film capacitor according to any of claims 1 to 3, wherein said protective layer includes at least a layer of a biaxially oriented polyphenylenesulfide film, and a layer of a substantially non-oriented polyphenylenesulfide film is stacked on at least one surface of said layer of said biaxially oriented polyphenylenesulfide film.

5. The film capacitor according to any of claims 1 to 4, wherein at least the outermost layer of said protective layer is a biaxially oriented polyphenylenesulfide film.

6. The film capacitor according to any of claims 1 to 3, wherein said protective layer comprises a plurality of layers, and all of the plurality of layers are substantially non-oriented polyphenylenesulfide films.

7. The film capacitor according to any of claims 1 to 4, wherein the outermost layer of said protective layer is a substantially non-oriented polyphenylenesulfide film whose outer surface is thermally crosslinked.

8. The film capacitor according to any of claims 1 to 4, wherein the outermost layer of said protective layer is a biaxially oriented polyphenylenesulfide film whose outer surface is thermally crosslinked.

9. The film capacitor according to any of claims 1 to 8, wherein said film capacitor is a stacking type capacitor in which substantially planar layers of said dielectric film and said electrodes are stacked.

10. The film capacitor according to any of claims 1 to 8, wherein said film capacitor is a winding type capacitor in which said dielectric film and said electrodes are wound at a state that they are stacked.

11. A process for producing a film capacitor characterized in that a substantially amorphous and substantially non-oriented polyphenylenesulfide film having a relative crystallization index of not greater than 3.0 is stacked on at least a part of a capacitance generating portion constructed from the layers of a dielectric film and electrodes to make a stacked body, and said stacked body is heated at a temperature of not less than 100° C. and lower than the melting point of polyphenylenesulfide, and pressed in the thickness direction of said stacked body at a pressure of not less than 1 kg/cm².

12. The process for producing a film capacitor according to claim 11, wherein said heated and pressed stacked body is further heat treated so that said substantially non-oriented polyphenylenesulfide film has a density of not less than 1,330 g/cm³.

13. A process for producing a film capacitor characterized in that a multi-layer film including at least one layer of a substantially amorphous and substantially non-oriented polyphenylenesulfide film having a relative crystallization index of not greater than 3.0 is made, said multi-layer film is heated at a temperature of not less than 100° C. and lower than the melting point of polyphenylenesulfide, and pressed in the thickness direction of said multi-layer film at a pressure of not less than 1 kg/cm², and thereafter, said multi-layer film is stacked on at least a part of the outer surface of a capacitance generating portion constructed from the layers of a dielectric film and electrodes.

14. The process for producing a film capacitor according to claim 13, wherein said heated and pressed multi-layer film is further heat treated so that said substantially non-oriented polyphenylenesulfide film has a density of not less than 1,330 g/cm³.

* * * * *

UNITED STATES PATENT AND TRADEMARK OFFICE
CERTIFICATE OF CORRECTION

PATENT NO. : 5,168,421
DATED : Dec. 1, 1992
INVENTOR(S) : Suzuki et al

It is certified that error appears in the above-identified patent and that said Letters Patent is hereby corrected as shown below:

Column 2, line 52, please change "polypropylene", first occurrence, to --polyolefin--.

Column 12, line 10, please change "500" to --600--.

Column 16, line 56, after "claim", please add --1--.

Signed and Sealed this

Fifth Day of October, 1993

Attest:

BRUCE LEHMAN

Attesting Officer  Commissioner of Patents and Trademarks